United States Patent
Petrov et al.

(10) Patent No.: US 11,611,632 B2
(45) Date of Patent: Mar. 21, 2023

(54) CLOUD TO ON-PREMISE PORT FORWARDING WITH IP ADDRESS BOUND TO LOOPBACK ALIAS

(71) Applicant: Nicira, Inc., Palo Alto, CA (US)

(72) Inventors: Andrey Todorov Petrov, Sofia (BG); Martin Valkanov, Sofia (BG)

(73) Assignee: NICIRA, INC., Palo Alto, CA (US)

( * ) Notice: Subject to any disclaimer, the term of this patent is extended or adjusted under 35 U.S.C. 154(b) by 1196 days.

(21) Appl. No.: 15/343,139

(22) Filed: Nov. 3, 2016

(65) Prior Publication Data

US 2018/0124198 A1    May 3, 2018

(51) Int. Cl.
| | |
|---|---|
| *G06F 15/16* | (2006.01) |
| *H04L 67/563* | (2022.01) |
| *H04L 12/46* | (2006.01) |
| *H04L 61/2592* | (2022.01) |
| *H04L 61/256* | (2022.01) |
| *H04L 9/40* | (2022.01) |

(52) U.S. Cl.
CPC ........ *H04L 67/563* (2022.05); *H04L 12/4633* (2013.01); *H04L 61/256* (2013.01); *H04L 61/2592* (2013.01); *H04L 63/0272* (2013.01)

(58) Field of Classification Search
CPC .............. H04L 12/4633; H04L 61/256; H04L 61/2592; H04L 63/0272; H04L 67/2814
See application file for complete search history.

(56) References Cited

U.S. PATENT DOCUMENTS

| | | | |
|---|---|---|---|
| 2013/0174246 A1* | 7/2013 | Schrecker | H04L 63/029 726/14 |
| 2015/0244788 A1* | 8/2015 | Fausak | G06F 16/972 709/203 |

* cited by examiner

*Primary Examiner* — Normin Abedin
(74) *Attorney, Agent, or Firm* — Su IP Consulting

(57) ABSTRACT

An example method to provide communication between a first computer in a first computer network and a second computer in a second computer network is disclosed. The method includes aliasing the second computer's address in the second computer network to a loopback interface of a third computer in the first computer network and establishing a tunnel between the third computer and a fourth computer in the second computer network. Establishing the tunnel includes configuring the fourth computer to forward traffic received from the tunnel to the second computer. The method further includes configuring routing in the first computer network to direct traffic destined for the second computer network to the third computer, and configuring the first computer to transmit packets destined for the second computer with the second computer's address in the second computer network.

20 Claims, 4 Drawing Sheets

CLOUD TO ON-PREMISE PORT FORWARDING WITH IP ADDRESS BOUND TO LOOPBACK ALIAS

BACKGROUND

Unless otherwise indicated herein, the approaches described in this section are not admitted to be prior art by inclusion in this section.

A hybrid cloud is a cloud computing environment where applications run across private, whether on-premises or not, and public clouds (e.g., Amazon Web Service Cloud). This arrangement allows organizations to store sensitive data on a private cloud while leveraging computational resources from the public cloud to run applications.

DETAILED DESCRIPTION

Figure 1:
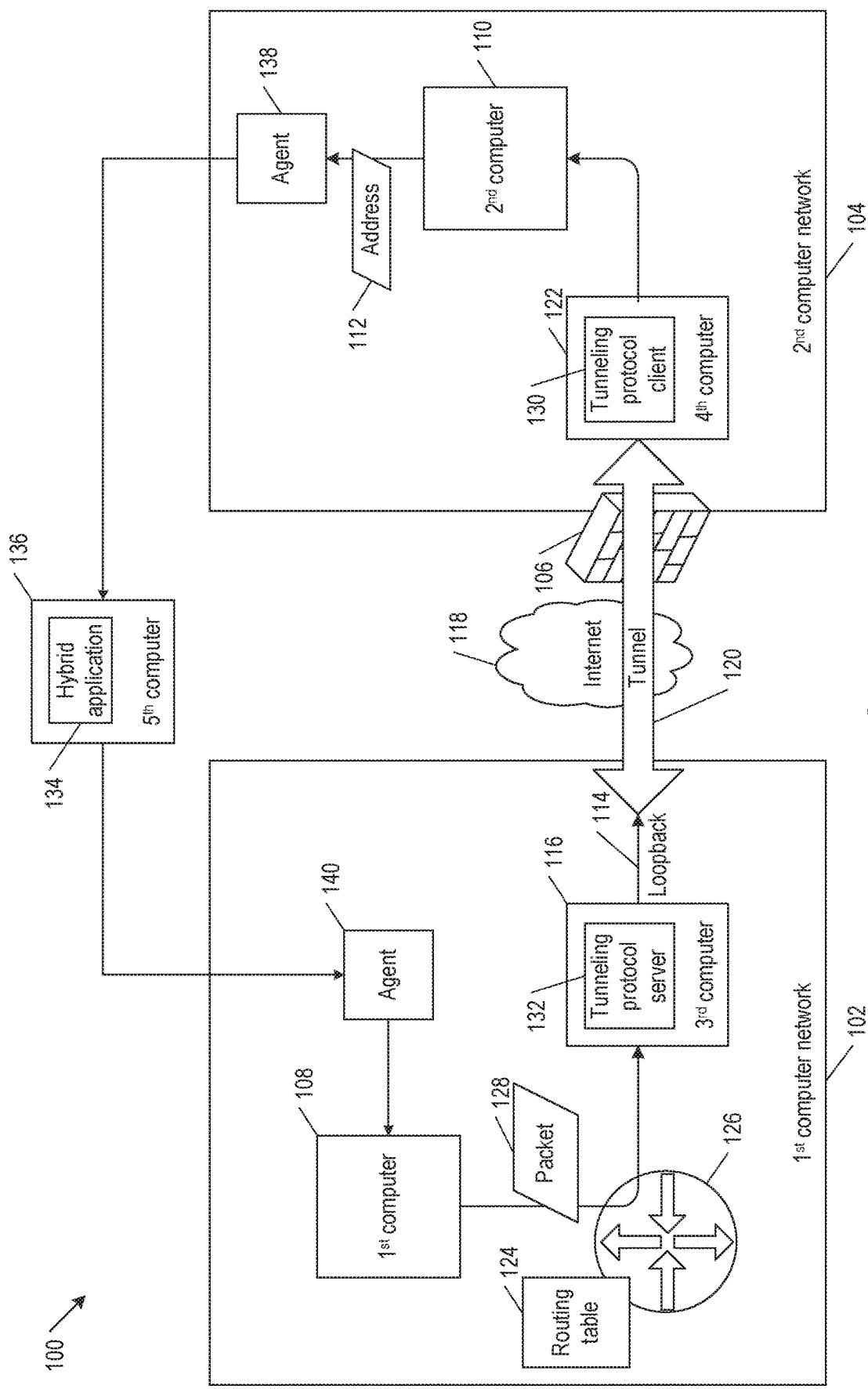
FIG. 1 illustrates a computer system including a first computer network and a second computer network in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

When a private cloud is protected by a firewall, a virtual private network (VPN) or network address translation (NAT) can be used to allow communication between the private cloud and a public cloud. However, setting up a VPN and configuring Internet protocol (IP) tables for NAT are complicated and time consuming. Thus, what is needed is a convenient way to enable communication across private and public clouds.

FIG. 1 illustrates a computer system 100 including a first computer network 102 and a second computer network 104 in examples of the present disclosure. First computer network 102 may be part of a public network, such as a private section of a public cloud (e.g., an Amazon Virtual Private Cloud (VPC) provisioned from Amazon Web Service (AWS) Cloud). Second computer network 104 may be a private network, such as an on or off-premise private cloud, protected by a firewall 106. The additional elements of system 100 are described herein with reference to various methods in examples of the present disclosure.

Figure 2:
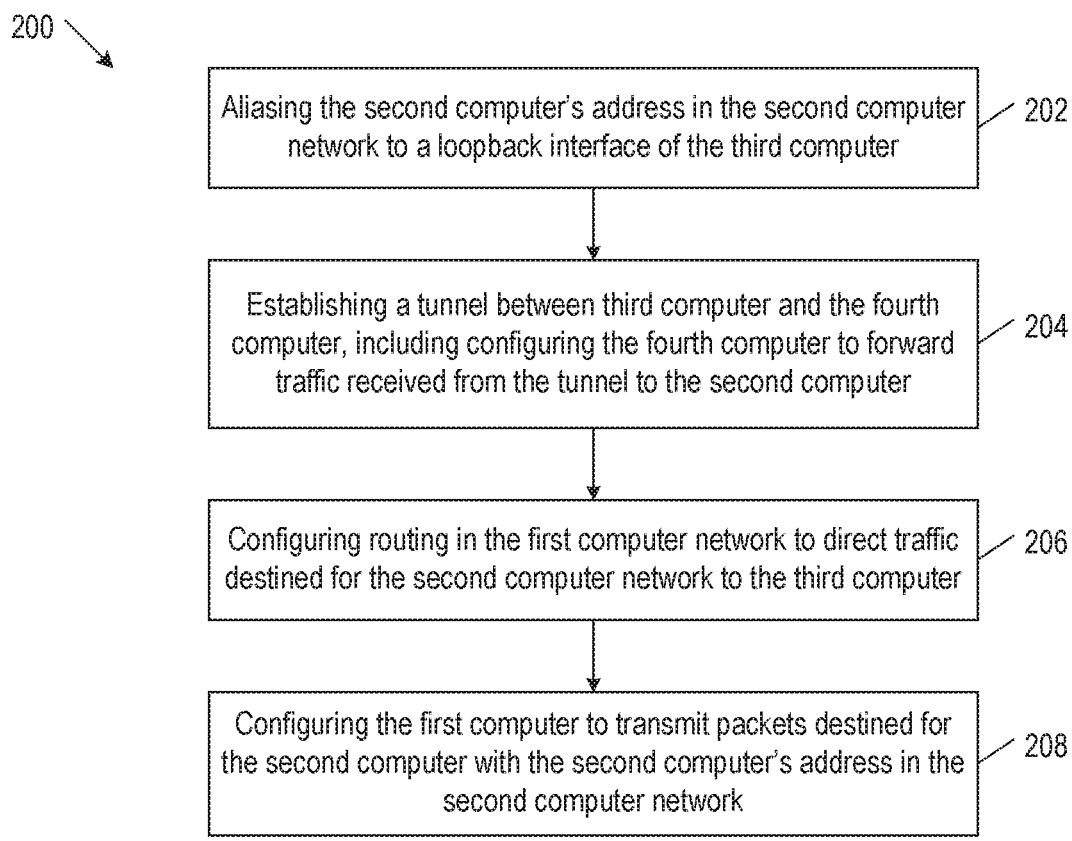
FIG. 2 is a flowchart of a method to configure the system of FIG. 1 for communication between a first computer in the first computer network of FIG. 1 and a second computer in the second computer network of FIG. 1 in examples of the present disclosure.

FIG. 2 is a flowchart of a method 200 to configure system 100 (FIG. 1) for communication between a first computer 108 (FIG. 1) in first computer network 102 (FIG. 1) and a second computer 110 (FIG. 1) in second computer network 104 (FIG. 1) in examples of the present disclosure. First computer 108 and second computer 110 may be physical computes or virtual machines on physical host computers.

Method 200, and any method described herein, may be implemented as instructions encoded on a computer-readable medium that is to be executed by processors in computers of system 100. Method 200, and any method described herein, may include one or more operations, functions, or actions illustrated by one or more blocks. Although the blocks are illustrated in sequential orders, these blocks may also be performed in parallel, and/or in a different order than those described herein. Also, the various blocks may be combined into fewer blocks, divided into additional blocks, and/or eliminated based upon the desired implementation.

Method 200 may begin in block 202. In block 202, the second computer's address 112 (FIG. 1) in second computer network 104 is aliased to a loopback interface 114 (FIG. 1) of a third computer 116 (FIG. 1) in first computer network 102. The second computer's address 112 includes a private Internet Protocol (IP) address and a transmission control protocol (TCP) port for accessing second computer 110 over second computer network 104. Third computer 116 is accessible by first computer 108 over first computer network 102. Third computer 116 is also accessible over the Internet 118 (FIG. 1) with a public IP address and a TCP port. Third computer 116 may be a physical computer or a virtual machine on a physical host computer. Block 202 may be followed by block 204.

In block 204, a tunnel 120 (FIG. 1) is established over the Internet 118 between third computer 116 in first computer network 102 and a fourth computer 122 (FIG. 1) in second computer network 104. Establishing tunnel 120 includes configuring fourth computer 122 to forward traffic received from tunnel 120 to second computer 110. Fourth computer 122 can access second computer 110 over second computer network 104 with the second computer's address 112. A tunneling protocol client 130 (FIG. 1) on fourth computer 122 establishes tunnel 120 with a tunneling protocol server 132 (FIG. 1) on third computer 116. For example, under a secure shell (SSH) remote port forwarding command, client 130 (FIG. 1) on fourth computer 122 establishes a SSH tunnel 120 with a SSH server 132 (FIG. 1) on third computer 116 and forwards the traffic received from SSH tunnel 120 to second computer 110. Once tunnel 120 is established, tunneling protocol server 132 listens for packets on loopback interface 114 of third computer 116. Fourth computer 122 may be a physical computer or a virtual machine on a physical host computer. Block 204 may be followed by block 206.

In block 206, the routing of first computer network 102 is configured to direct traffic destined for a range of addresses (e.g., a subnet) in second computer network 104, which includes second computer 110, to third computer 116. For example, a rule is added to a routing table 124 (FIG. 1) of a router 126 (FIG. 1) in first computer network 102 to direct traffic destined for the subnet of second computer network 104, which includes second computer 110, to third computer 116. This ensures packets destined for second computer 110 are routed to third computer 116. Routing table 124 may be a VPC route table for a router 126 in an Amazon VPC. Router 126 may be a physical router or a virtual router implemented on a physical router. Block 206 may be followed by block 208.

In block 208, first computer 108 is configured to transmit packets destined for second computer 110 with the second computer's address 112 in second computer network 104 as the packets' destination. A method is described later for providing the second computer's address 112 to first computer 108.

Figure 3:
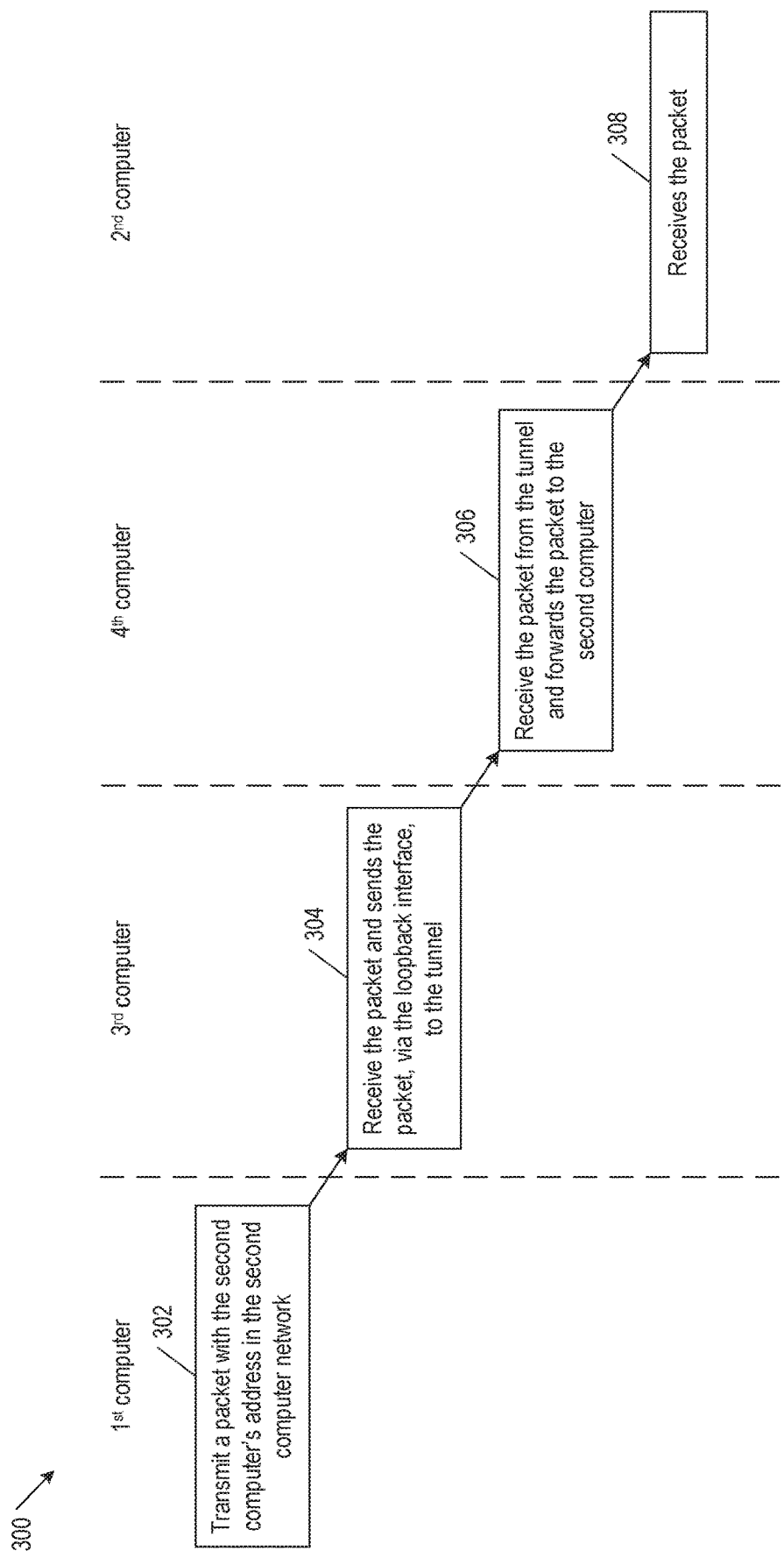
FIG. 3 is a swim lane flowchart illustrating a method for the first computer of FIG. 1 and the second computer of FIG. 1 to communicate after the system of FIG. 1 is configured by the method of FIG. 2 in examples of the present disclosure.

FIG. 3 is a swim lane flowchart illustrating a method 300 for first computer 108 (FIG. 1) and second computer 110 (FIG. 1) to communicate after system 100 (FIG. 1) is configured by method 200 (FIG. 2) in examples of the present disclosure. Method 300 may begin in block 302.

In block 302, first computer 108 transmits a packet 128 (FIG. 1) with the second computer's address 112 in second computer network 104 as the packet's destination. Block 302 may be followed by block 304.

In block 304, third computer 116 (FIG. 1) receives packet 128 and sends it to loopback interface 114 (FIG. 1) because packet 128 has the second computer's address 112 as the packet's destination and the second computer's address 112 is bound to loopback interface 114. As tunneling protocol server 132 (FIG. 1) is listening at loopback interface 114, tunneling protocol server 132 sends packet 128 over tunnel 120 to fourth computer 122 (FIG. 1). Block 304 may be followed by block 306.

In block 306, tunneling protocol client 130 (FIG. 1) on fourth computer 122 receives packet 128 from tunnel 120 and forwards packet 128 to second computer 110. Block 306 may be followed b block 308.

In block 308, second computer 110 receives packet 128.

Figure 4:
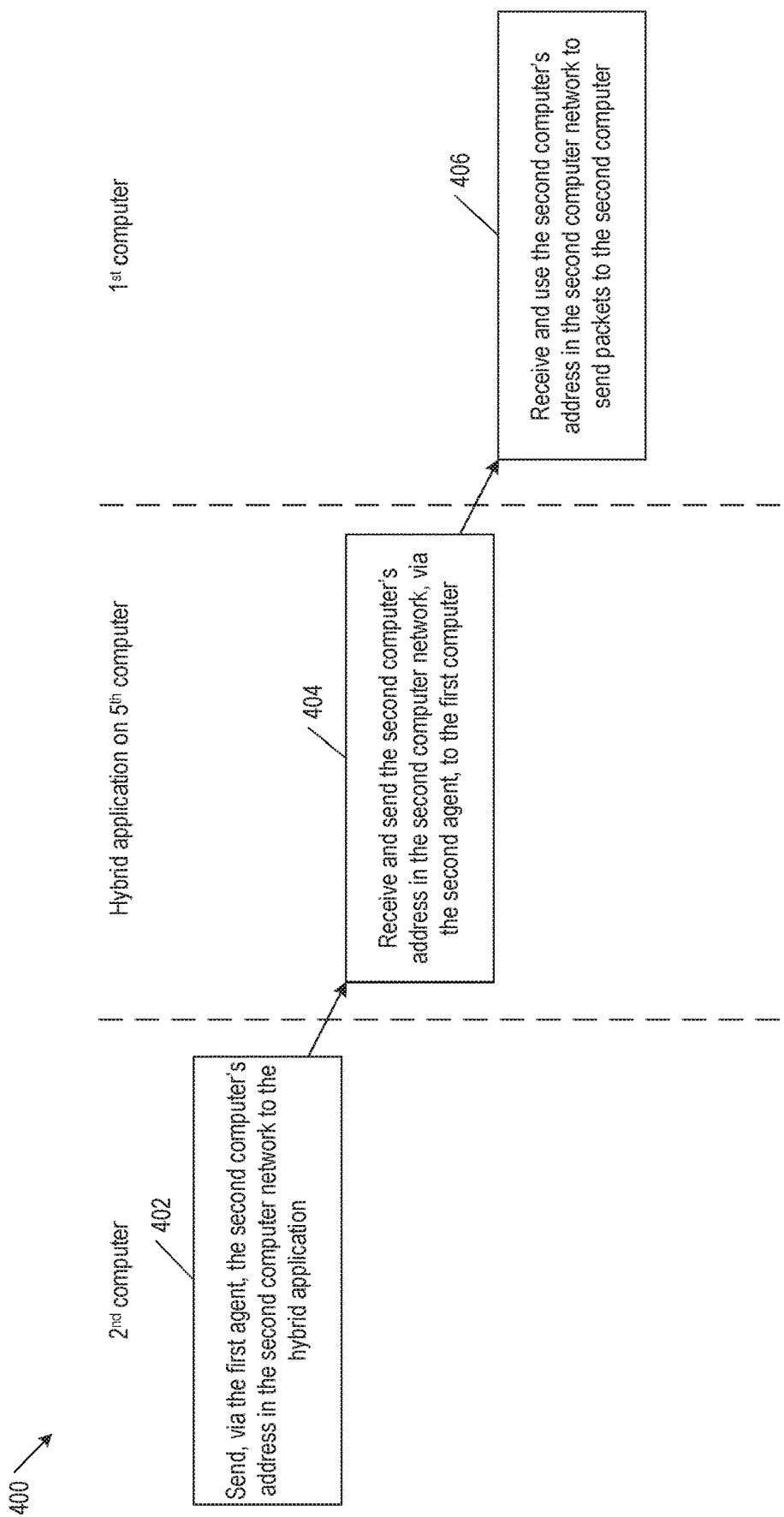
FIG. 4 is a swim lane flowchart illustrating a method for providing the address of the second computer of FIG. 1 to the first computer of FIG. 1 in examples of the present disclosure.

FIG. 4 is a swim lane flowchart illustrating a method 400 for providing the second computer's address 112 (FIG. 1) to first computer 108 (FIG. 1) in examples of the present disclosure. Method 400 may be part of method 200 (FIG. 2). Method 400 may begin in block 402.

In block 402, second computer 110 sends the second computer's address 112 to a hybrid application 134 (FIG. 1) on a fifth computer 136 (FIG. 1). Hybrid application 134 is able to communicate with its agent 138 (FIG. 1) in second computer network 104 and its agent 140 (FIG. 1) in first computer network 102. For example, second computer 110 sends the second computer's address 112 to agent 138, which forwards the second computer's address 112 to hybrid application 134. Block 402 may be followed by block 404.

In block 404, hybrid application 134 receives the second computer's address 112 and sends it to first computer 108. For example, hybrid application 134 sends the second computer's address 112 to agent 140, which forwards the second computer's address 112 to first computer 108. Block 404 may be followed by block 406.

In block 406, first computer 108 receives the second computer's address 112 and uses it to send packets to second computer 110. For example, first computer 108 sets the second computer's address 112 as the destination for packets to second computer 110. As described earlier, first computer network 102 directs such packets to third computer 116, which sends them over tunnel 120 to fourth computer 122 for forwarding to second computer 110.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to provide communication between a first computer in a first computer network and a second computer in a second computer network, the first computer network corresponding to at least part of a public cloud, comprising:
    aliasing the second computer's address in the second computer network to a loopback interface of a third computer in the first computer network, wherein the second computer network corresponds to a private cloud protected by a firewall;
    establishing a tunnel between the third computer and a fourth computer in the second computer network, wherein establishing the tunnel includes configuring the fourth computer to forward traffic received from the tunnel to the second computer;
    configuring routing in the first computer network to direct traffic destined for the second computer network to the third computer; and
    configuring the first computer to transmit packets destined for the second computer with the second computer's address in the second computer network.

2. The method of claim 1, further comprising:
    the first computer transmits a packet with the second computer's address in the second computer network;
    the third computer receives the packet and sends the packet, via the loopback interface, to the tunnel; and
    the fourth computer receives the packet from the tunnel and forwards the packet to the second computer.

3. The method of claim 1, further comprising providing the second computer's address in the second computer network to the first computer.

4. The method of claim 1, wherein the tunnel comprises a secure shell (SSH) tunnel, the third computer comprises a SSH server, the fourth computer comprises a SSH client.

5. The method of claim 1, wherein the first computer network comprises a virtual private cloud in the public cloud.

6. The method of claim 1, wherein the first computer, the second computer, the third computer, and the fourth computer are physical computers, virtual machines on physical host computers, or a combination of physical computers and virtual machines.

7. The method of claim 1, wherein configuring routing in the first computer network comprising configuring a routing table of a router in the first computer network.

8. A non-transitory, computer-readable storage medium encoded with instructions executable by a processor to provide communication between a first computer in a first computer network and a second compute in a second computer, the first computer network corresponding to at least part of a public cloud, the instructions comprising:
aliasing the second computer's address in the second computer network to a loopback interface of a third computer in the first computer network, wherein the second computer network corresponds to a private cloud protected by a firewall;
establishing a tunnel between the third computer and a fourth computer in the second computer network, wherein establishing the tunnel includes configuring the fourth computer to forward traffic received from the tunnel to the second computer;
configuring routing in the first computer network to direct traffic destined for the second computer network to the third computer; and
configuring the first computer to transmit packets destined for the second computer with the second computer's address in the second computer network.

9. The storage medium of claim 8, wherein the instructions further comprises:
the first computer transmits a packet with the second computer's address in the second computer network;
the third computer receives the packet and sends the packet, via the loopback interface, to the tunnel; and
the fourth computer receives the packet from the tunnel and forwards the packet to the second computer.

10. The storage medium of claim 8, wherein the instructions further comprises providing the second computer's address in the second computer network to the first computer.

11. The storage medium of claim 8, wherein the tunnel comprises a secure shell (SSH) tunnel, the third computer comprises a SSH server, the fourth computer comprises a SSH client.

12. The storage medium of claim 8, wherein the first computer network comprises a virtual private cloud in the public cloud.

13. The storage medium of claim 8, wherein the first computer, the second computer, the third computer, and the fourth computer are physical computers, virtual machines on physical host computers, or a combination of physical computers and virtual machines.

14. The storage medium of claim 8, wherein configuring routing in the first computer network comprising configuring a routing table of a router in the first computer network.

15. A system for communication between a first computer in a first computer network and a second computer in a second computer network, the first computer network corresponding to at least part of a public cloud, comprising:
the first computer network, comprising:
the first computer configured to transmit packets destined for the second computer with the second computer's address in the second computer network, wherein the second computer network corresponds to a private cloud protected by a firewall;
a third computer configured with the second computer's address in the second computer network aliased on a loopback interface of the third computer; and
a router configured to direct traffic destined for the second computer network to the third computer; and
the second computer network comprising:
the second computer; and
a fourth configured with a tunnel to the third computer and to forward traffic received from to the tunnel second computer.

16. The system of claim 15, wherein:
the first computer transmits a packet with the second computer's address in the second computer network;
the router directs the packet to the third computer;
the third computer sends the packet, via the loopback interface, to the tunnel; and
the fourth computer receives the packet from the tunnel and forwards the packet to the second computer.

17. The system of claim 15, further comprising a fifth computer configured to receive the second machine's address from the second computer network and send the second computer's address to the first computer network.

18. The system of claim 15, wherein the tunnel comprises a secure shell (SSH) tunnel, the third computer comprises a SSH server, the fourth computer comprises a SSH client.

19. The system of claim 15, wherein the first computer network comprises a virtual private cloud in the public cloud.

20. The system of claim 15, wherein the first computer, the second computer, the third computer, and the fourth computer are physical computers, virtual machines on physical host computers, or a combination of physical computers and virtual machines.

* * * * *